United States Patent [19]
Fritzinger et al.

[11] Patent Number: 5,699,869
[45] Date of Patent: Dec. 23, 1997

[54] AUTOMATICALLY ENGAGING AND DISENGAGING GEAR BOX ASSEMBLY

[75] Inventors: Daniel D. Fritzinger, Grabill; Craig R. Hall, Fort Wayne, both of Ind.

[73] Assignee: Mattel, Inc., El Segundo, Calif.

[21] Appl. No.: 450,376

[22] Filed: May 25, 1995

[51] Int. Cl.$^6$ ..................................................... B60K 17/14
[52] U.S. Cl. ..................... 180/65.5; 74/405; 180/65.6; 477/15
[58] Field of Search .................... 74/405, 421 A, 74/462; 477/8, 15, 17, 20; 180/65.1, 65.5, 65.6, 65.7, 214, 216

[56] References Cited

U.S. PATENT DOCUMENTS

| | | | |
|---|---|---|---|
| 1,327,129 | 1/1920 | Wolff | 477/17 X |
| 3,601,234 | 8/1971 | Ingraham | 477/15 |
| 3,995,366 | 12/1976 | McLean . | |
| 4,059,918 | 11/1977 | Matsushiro . | |
| 4,116,084 | 9/1978 | Masuda . | |
| 4,152,866 | 5/1979 | Suda . | |
| 4,399,883 | 8/1983 | Todokoro . | |
| 4,475,618 | 10/1984 | Kennedy et al. . | |
| 4,484,649 | 11/1984 | Kennedy et al. . | |
| 4,560,022 | 12/1985 | Kassai | 180/65.1 |
| 4,573,943 | 3/1986 | Kennedy et al. . | |
| 4,984,645 | 1/1991 | White, Jr. | 180/65.6 |
| 5,497,844 | 3/1996 | Fritzinger | 180/65.6 |

*Primary Examiner*—Brian L. Johnson
*Assistant Examiner*—Michael Mar
*Attorney, Agent, or Firm*—Kolisch Hartwell Dickinson McCormack & Heuser

[57] ABSTRACT

A gear box assembly for automatically engaging and disengaging an output gear which is non-rotatably concentrically mounted on a driven axle shaft attached to plural wheels in a children's ride-on toy is described. The assembly includes an electric motor with a pinion driving plural driven gears, and a yoke which is pivotable between two positions and provides a mount for at least one of the plural driven gears. In one position, the yoke pivotally engages the output gear and drives the vehicle's wheels, and in another position, the yoke pivotally disengages the output gear thereby allowing the vehicle's wheels to freely rotate without driving or back-driving the motor or other gears. In the preferred embodiment, the yoke is counterbalanced for rotation about a defined axis. In alternative embodiments, the yoke includes a friction member for developing friction between one of the driven gears to rotate the yoke into engagement.

16 Claims, 3 Drawing Sheets

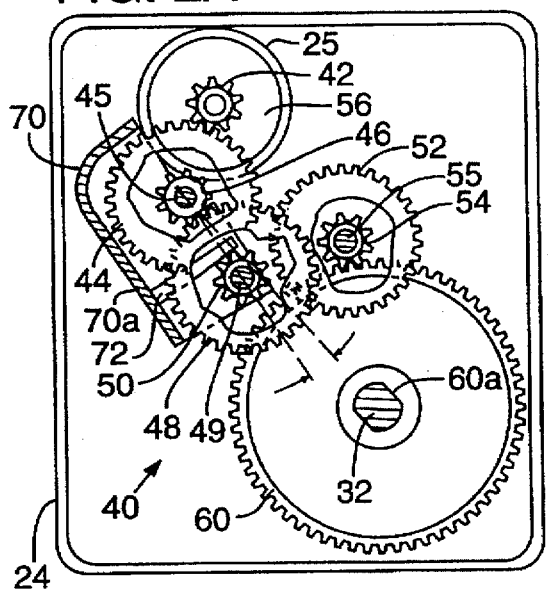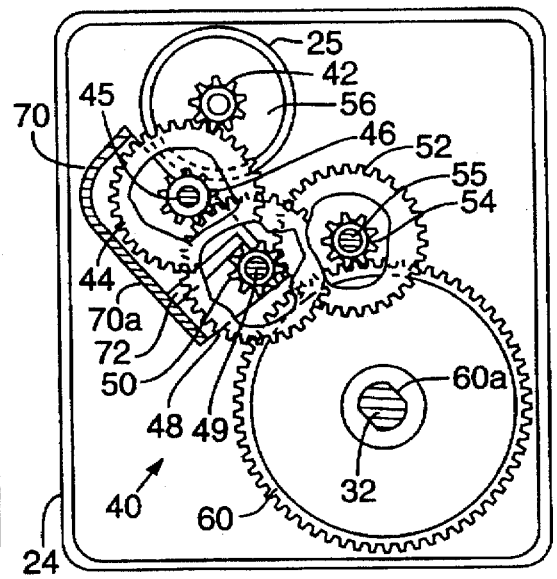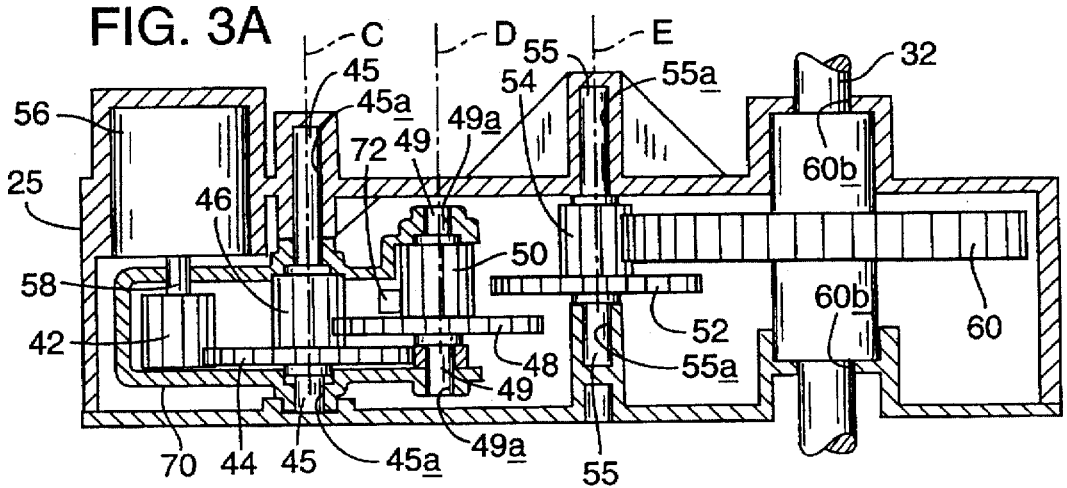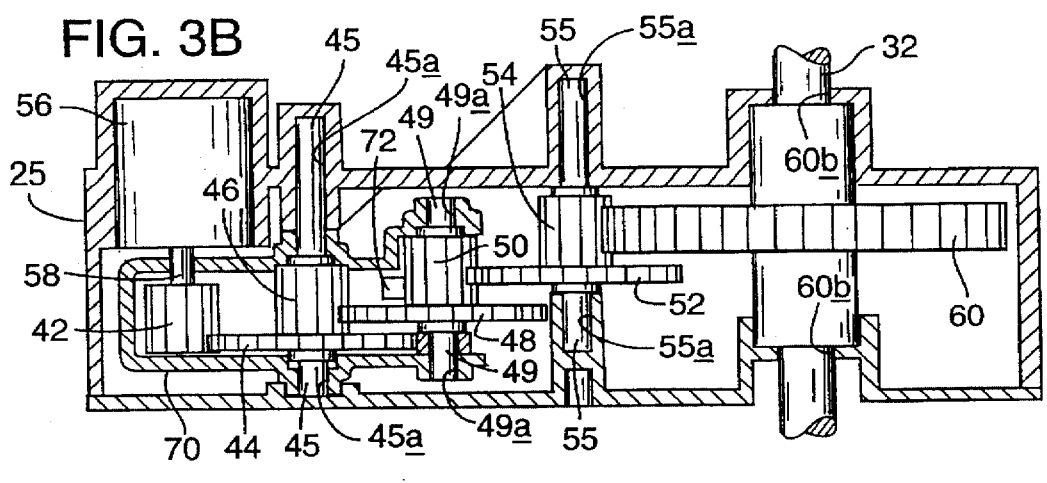

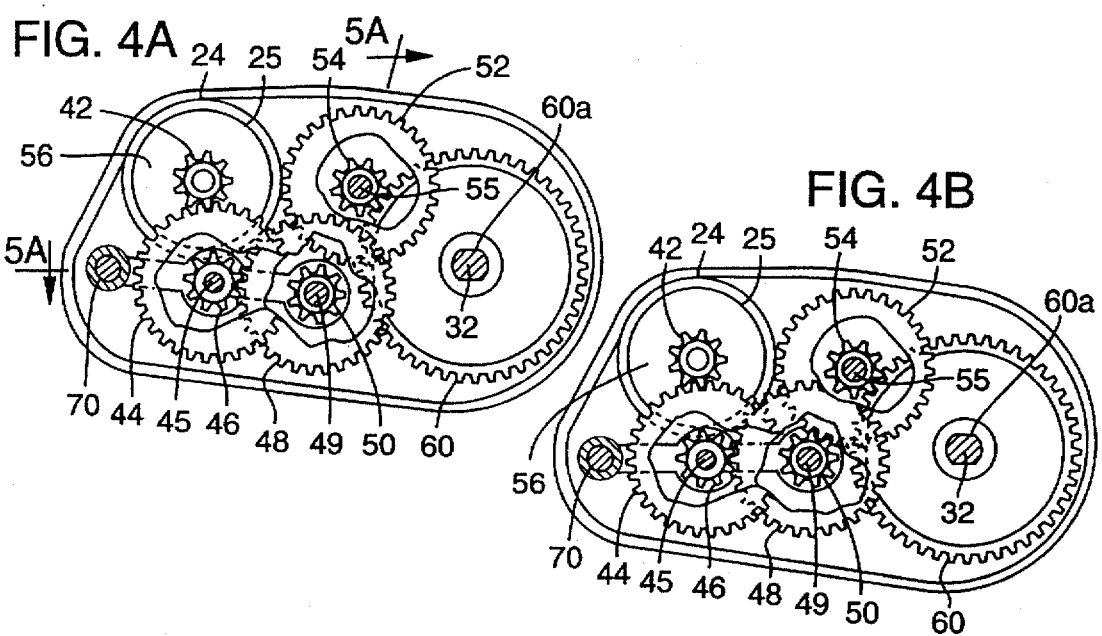
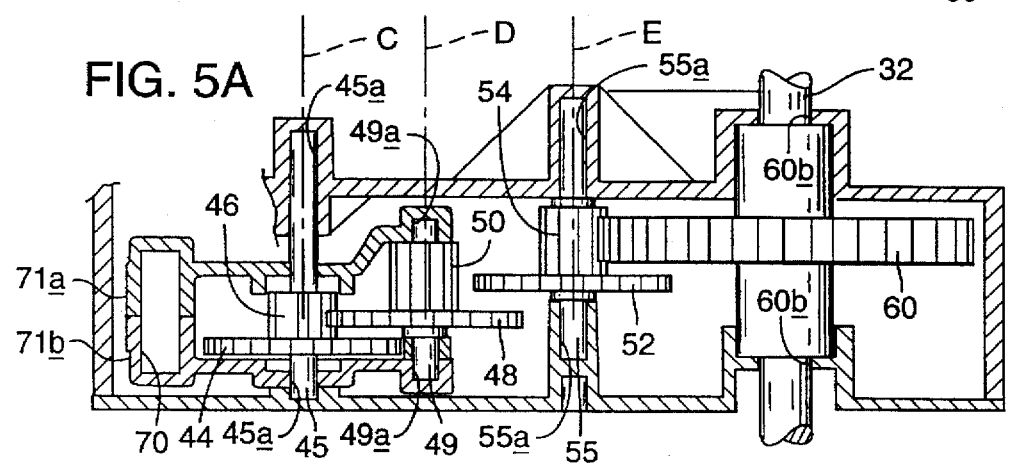
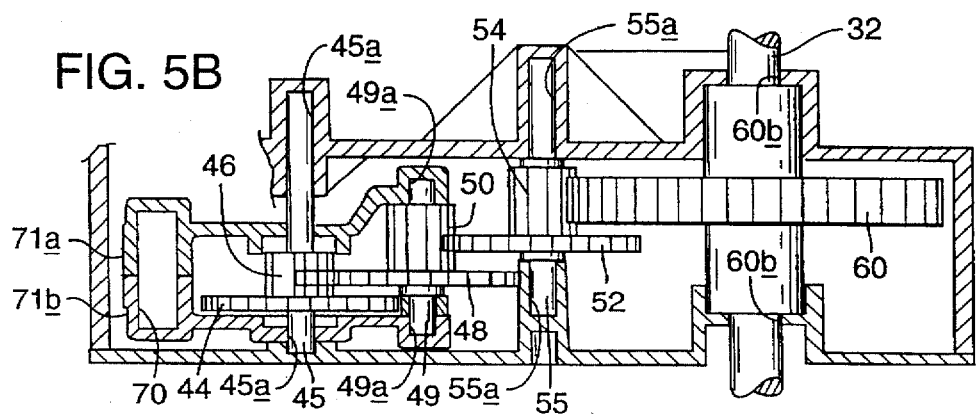

AUTOMATICALLY ENGAGING AND DISENGAGING GEAR BOX ASSEMBLY

BACKGROUND AND SUMMARY OF THE INVENTION

The present invention relates to a gear assembly for children's ride-on vehicles, and more particularly to a gear assembly which engages and disengages automatically when a motor is energized or de-energized.

A significant problem with children's ride-on vehicles of the type which employ a small electric motor to drive an output gear connected to the vehicle's wheels, is that when the motor is not energized and a child pushes the toy in either a forward or reverse direction, the motor and gears are involuntary driven. That is, the motor and gears are driven without the motor being energized. This is undesirable for a number of reasons. First, the involuntary driving or back-driving, as it is sometimes called, results in unnecessary wear and tear of the motor and gears. Second, if the output gear remains engaged, a young child using the vehicle will encounter resistance when they attempt to push the vehicle forward or backward without energizing the motor. Some children will be unable to push the vehicle because they cannot overcome the resistance of the gears and motor and hence will be unable to use the vehicle except for when the motor is energized. In the event such a vehicle were on a hard surface such as a linoleum floor, the child may be able to push the vehicle, but the wheels would simply not turn due to friction between the engaged gear train.

Conventional attempts have been made to solve this problem. Such prior art solutions typically include a lever or a spring-loaded gear to disengage the driving gears thereby freeing up the output gear when the motor is not energized.

For example, U.S. Pat. No. 4,152,866 discloses a gear assembly for use in a riding toy, having a spring-biased disc member axially joined to a selectively driven gear. The disc member is engaged by a pivotable lever which must be moved by the rider to selectively engage and disengage the driven gear with a driving gear connected to the toy's motor. When the selectively driven gear is engaged by the lever, the lever simultaneously completes an electrical circuit which energizes the motor thereby powering the vehicle. When the lever disengages the selectively driven gear, the vehicle's wheels may be rotated without driving or back-driving the motor or other gears. Hence, a child must physically move a lever to engage the gear train.

U.S. Pat. No. 4,484,649 discloses a child's riding toy having an electric motor and a gear assembly. Plural driven gears are selectively engaged by a driving gear wherein the driving gear is attached by a spring to the assembly's housing and biased in a disengaged position. When the motor is energized, the force of the spring is overcome and the driving gear moves into engagement with the plural driven gears. When disengaged, the output gear which is connected to the vehicle's wheels may spin freely without driving or back-driving the motor or other gears. However, should the spring slip out of position, the toy will be rendered useless.

With the above problems in mind, it is a general object of the invention to provide a gear assembly which allows an output gear which is connected to the vehicle's wheels to be automatically engaged and disengaged when the vehicle's motor is energized or de-energized.

It is another object of the invention to enable the output gear to rotate freely without involuntarily driving or back-driving the motor or other gears when the motor is de-energized and the vehicle is moved forward or rearward.

It is a further object of the invention to provide a vehicle which may be easily pushed forward or rearward by a child when the motor is de-energized. Thus, a vehicle in which the gear assembly of the present invention has been incorporated will allow a child to sit on it and use their legs for locomotion or alternatively push the vehicle from behind.

Another object of the invention is to provide an assembly that achieves the above results and yet is economical to manufacture by virtue of having relatively few parts, featuring components readily moldable from plastic and not requiring precisely fitting parts.

Yet another object of the invention is to provide a structure that is rugged enough to tolerate the abuses expected in the operating environment.

In brief summary, the invention achieves these and other objects in the form of a children's riding vehicle having a gear box assembly unit which includes plural driven gears and an output gear non-rotatably connected to an axle shaft connected to the vehicle's wheels. A motor having a pinion is drivingly connected to the plural driven gears and a pivotable yoke provides a mount for at least one of the driven gears. Importantly, when the motor is energized, the yoke automatically pivots to one position for engaging the output gear and driving the vehicle's wheels. When the motor is de-energized, the yoke automatically pivots to another position for disengaging the output gear and allowing the vehicle's wheels to rotate freely without driving or back-driving the motor.

These and other objects and advantages are obtained by the invention, which is described below in conjunction with the accompanying drawings.

BRIEF DESCRIPTION OF THE DRAWINGS

FIG. 2A is a side-sectional view of an embodiment of the gear box assembly in the disengaged position, along the line 2—2 in FIG. 1.

FIG. 2B is a side-sectional view of an embodiment of the gear box assembly in the engaged position, along the line 2—2 in FIG. 1.

FIG. 3A is a top-plan view of the gear box assembly of FIG. 2A in the disengaged position taken along line 3—3 in FIG. 1.

FIG. 3B is a top-plan view of the gear box assembly of FIG. 2B in the engaged position, taken along line 3—3 in FIG. 1.

FIG. 4A is a side-sectional view of the preferred embodiment of the gear box assembly in the disengaged position.

FIG. 4B is a side-sectional view of the preferred embodiment of the gear box assembly in the engaged position.

FIG. 5A is a top view of the gear box assembly, taken along line 5A—5A in FIG. 4A, showing the assembly in the disengaged position.

FIG. 5B is a top view of the gear box assembly, similar to FIG. 5A, only showing the assembly in the engaged position.

DETAILED DESCRIPTION OF PREFERRED EMBODIMENTS

Figure 1:
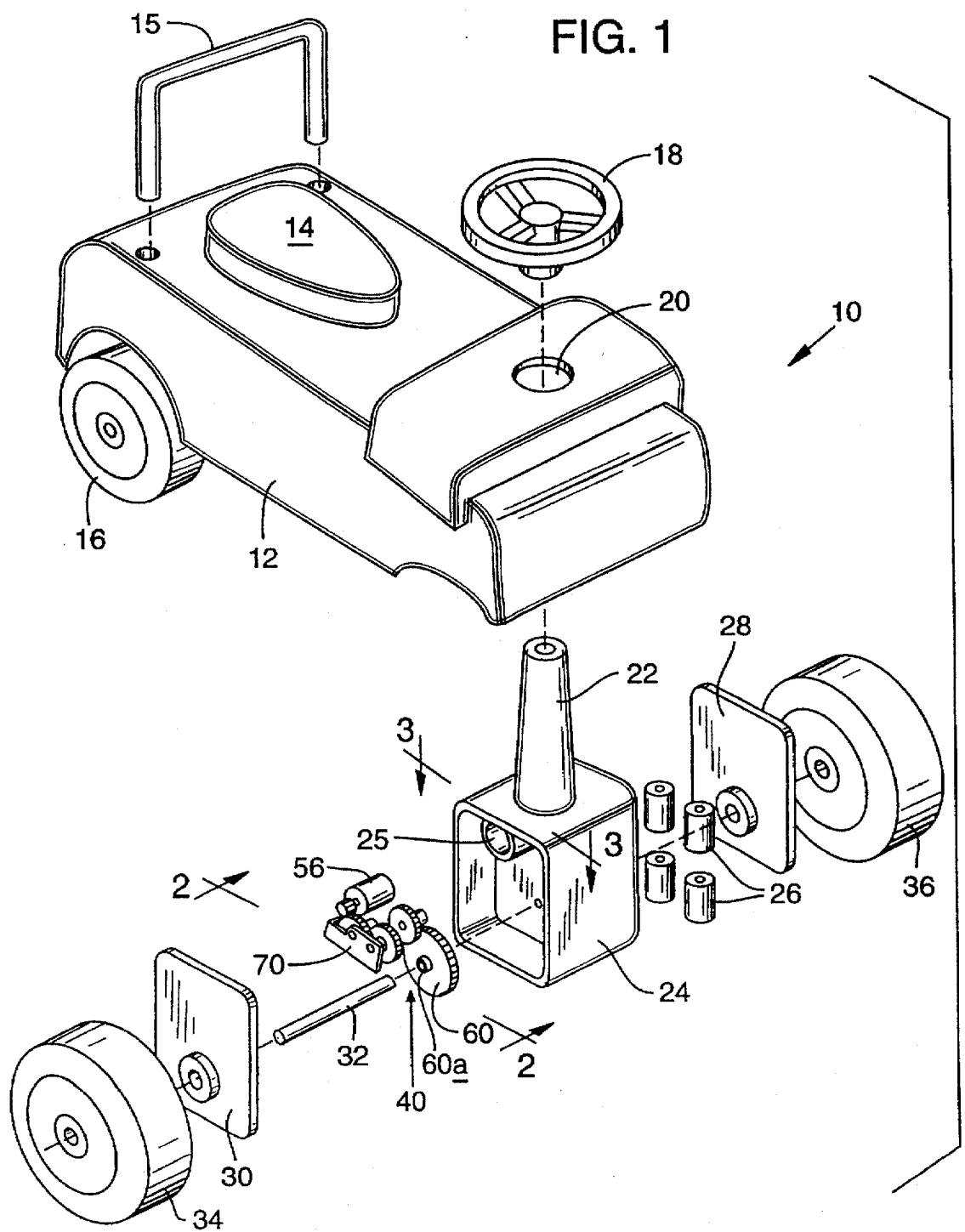
FIG. 1 is an exploded view of a child's riding toy using the gear box of the present invention.

As shown in FIG. 1, a toy riding vehicle utilizing the gear box assembly unit according to the present invention is generally indicated at 10 and includes a frame 12 having a seat 14, a U-shaped support bar 15 attached to the seat, and back wheels 16, only one of which is shown.

A steering wheel 18 is mounted to a steering column 22 which is received through an aperture 20 in frame 12. Joined to the bottom portion of steering column 22 and mounted on the frame is a gear housing 24 molded from durable plastic. Housing 24 defines a gear box inside of which a gear box assembly unit, indicated generally at 40, is housed. Housing 24 includes a motor boss 25 joined thereon for receiving a motor 56, and is also equipped to receive plural batteries 26 for powering the motor and hence the gears described in more detail below. Housing 24 encloses batteries 26 and gear box assembly unit 40 via side housing portions 28, 30 respectively. When so enclosed, unit 40 and hence housing 24 provide a mount for an axle shaft 32 described in more detail below.

FIGS. 1, 2A–B, and 4A–B show that driven axle shaft 32 has a non-circular cross-section received through a bore 60a in an output gear 60, most easily seen in FIGS. 2A–B and 4A–B. As shown in FIG. 1, shaft 32 extends transversely of vehicle 10 and has a corresponding vehicle wheel 34, 36 non-rotatably secured to each of its ends. Output gear 60 is concentric with shaft 32 and is non-rotatably connected thereto by virtue of the mate between the shaft's non-circular cross-section and the complementary shape of bore 60a.

FIGS. 2A–B and 4A–B show unit 40 mounted within housing 24 where unit 40 may be seen to include motor 56, an input or motor pinion 42, driven gears 44 to 60, and a yoke 70 (described below), for transmitting the driving power from motor 56 to output gear 60 and hence shaft 32 and wheels 34, 36. Driven gears 44 to 60 in turn may be seen to include a first gear 44 with a concentrically-mounted pinion 46, gear 44 being drivingly connected to pinion 42 on motor 56. Pinion 46 on gear 44 is drivingly connected to plural gears 48 to 54 via second gear 48 having a concentric pinion 50 for selectively driving a third gear 52 having a concentric pinion 54 for driving output gear 60 described in more detail below.

As shown in FIGS. 3A–B and 5A–B, gear 44 and its pinion 46 are mounted on a gear pin 45, gear 48 and its pinion 50 are mounted on a gear pin 49, and gear 52 and its pinion 54 are mounted on a gear pin 55. All of the gear pins are suitably mounted in wells in either housing 24 or yoke 70. As mentioned above, gear 44 is mounted to be in driving contact with motor pinion 42. Gear 48 is in driving contact with pinion 46, and pinion 50 is in selective driving contact with gear 52. That is, pinion 50 is in driving contact with gear 52 only when the motor is energized (FIGS. 3B, 5B) and is not in driving contact with gear 52 when the motor is de-energized (FIGS. 3A, 5A).

Gears 44 and 46 rotate about gear pin 45 which is parallel to output shaft 58 of motor 56 and is mounted on housing 24 in gear wells 45a as shown in FIGS. 3A–B, 5A–B. Gear pin 45 defines what may be viewed as a first rotation axis C which is represented by a dashed line in FIGS. 3A, 5A and described in more detail below. Gears 48 and 50 rotate about gear pin 49 which is mounted on yoke 70 in wells 49a and defines a second rotation axis D as shown. Gears 52 and 54 rotate about gear pin 55 which is mounted in wells 55a and defines a third rotation axis E as shown.

Yoke 70 is preferably of molded plastic and may be of unitary construction as shown in FIGS. 3A–B, or may be formed from two separately molded portions suitably bonded together such as portions 71a, 71b in FIGS. 5A–B. The yoke provides a mount for gears 44 to 50 and is pivotably mounted about axis C for bringing pinion 50 on gear 48 into driving contact with gear 52. More specifically, yoke 70 pivots about axis C between two positions, a disengaged position (FIGS. 2A, 3A, 4A, and 5A), and an engaged position (FIGS. 2B, 3B, 4B, and 5B). In the disengaged position, gear 50 is separated from gear 52 as shown. It is in this position that the vehicle's wheels 34, 36 (FIG. 1), may rotate freely without driving or back-driving the motor or gears 42 to 50. Hence, in the disengaged position a child may sit on the vehicle and scoot it across the floor using their legs for locomotion. Alternatively, a child may stand behind the vehicle, grasp bar 15 in FIG. 1, and use it to support themselves when they walk. In the engaged position, yoke 70 pivots about axis C to bring pinion 50 into driving contact with gear 52 which drives output gear 60 (and hence the vehicle's wheels).

In the preferred embodiment shown in FIGS. 4A–B, 5A–B, yoke 70 is suitably counterbalanced about axis C and assumes pivotable disposition relative to gear 44. More specifically, yoke 70 is counterbalanced about gear pin 45 and in such disposition gears 44, 48 assume a generally horizontal orientation relative to the ground. In this configuration, the yoke may be thought of as teetering about gear pin 45 so that when the motor is engaged, the yoke pivots pinion 50 on gear 48 into engagement with gear 52 thereby driving the gear assembly and hence the vehicle. When the motor is de-energized, the yoke teeters or pivots pinion 50 out of engagement with gear 52 allowing the vehicle to be pushed forward or backward without driving or backdriving the motor. It will be appreciated that the inherent friction in the gear assembly provides the necessary resistance to develop the moment necessary for enabling the gears to engage. Moreover, suitable weights may be added to the enclosure at the free end of yoke 70 (see FIGS. 5A–B) to appropriately balance the yoke about gear pin 45.

In an alternative embodiment, and one shown in FIGS. 2A–B, 3A–B, yoke 70 pivots about axis C due to frictional force developed between gear 50 and a friction member 72 which is joined to bottom 70a of yoke 70 as shown in FIGS. 2A and 2B. Preferably, friction member 72 is an integral part of yoke 70 having been molded together with the yoke. When gears 44 and 48 are mounted on gear pins 45 and 49 as described above, friction member 72 presses against pinion 50 on gear 48 whereby the friction member is bent backward slightly. This frictional contact inhibits the rotation of gear 50 when motor 52 is energized causing yoke 70 to rotate upwardly about axis C bringing pinion 50 into engagement with gear 52.

More specifically and as shown in FIGS. 2A–B and 3A–B, when motor 56 is energized, shaft 58 rotates motor pinion 42 clockwise engaging gear 44 and rotating it counter-clockwise. Similarly, pinion 46 engages gear 48 rotating it clockwise. However, because friction member 72 presses against gear 50, the rotation of gear 48 is slightly inhibited causing yoke 70 to pivot upwardly about pin 45 (axis C) thereby bringing pinion 50 into driving engagement with gear 52 which drives output gear 60 and hence the wheels of the vehicle.

When motor 56 is de-energized, gear 52 is no longer driven and the weight of yoke 70 and gears 44 through 50 pivots the yoke downwardly about pin 45 (axis C) disengaging pinion 50 from gear 52. Thereafter, the vehicle may be pushed forward and backward without driving or back-driving the motor as described above.

In another embodiment, the force necessary to cause yoke 70 to pivot into engagement is developed by meshing gears 46 and 48 tightly so that the meshed teeth will bind causing gear 48 to press against gear pin 49, thereby inhibiting its rotation and causing the yoke to rotate into engagement with gear 52.

In another embodiment, the necessary frictional force is developed by narrowing the walls of yoke 70 so that one of the gears 44 through 50 is squeezed. With the rotation of the gears inhibited, the yoke will rotate into engagement with gear 54 as described above.

Yet another way of developing the necessary frictional force to cause the yoke to pivot into engagement, is by having a friction tab on either of the gears 44 to 50 press against the yoke, or by having a friction tab on the yoke press against the gears. The friction tab will inhibit the rotation of the gears by setting up a frictional force between the gears and the yoke wall thereby causing the yoke to pivot into engagement. It will be understood and appreciated by those of skill in the art that the necessary friction required between the gears and the yoke may be developed any number of ways without departing from the spirit and scope of the invention.

As mentioned above, gear housing 24 and yoke 70 are preferably constructed of molded plastic and are molded to have apertures or wells therein for receiving the gear pins described above. Specifically, housing 24 includes molded wells 45a and 55a for accommodating gear pins 45 and 55 respectively, and yoke 70 includes molded well 49a for accommodating gear pin 49. Yoke 70 also includes dual aligned apertures through which gear pin 45 passes.

Preferably, gears 44, 48 and 52 are the same size, and pinions 46, 50 and 54 are the same size. In the preferred embodiment, the gears are conventional external spur gears having involute tooth profiles, with manufactured pressure angles of 20° and a diametral pitch of 30. Gears 44, 48 and 52 include 43 teeth, while pinions 46, 50 and 54 each have 12 teeth. Output gear 60 has a manufactured pressure angle of 20°, a diametral pitch of 30 and 83 teeth.

One important aspect of the designs discussed above is the angular relationship which must exist between each centerline of gears 44, 48, 52 (axes C, D, E, respectively) in order for proper engagement and disengagement of the gears to occur. This angular relationship is important insofar as the dynamics of engaged gears generally, and the balancing of forces which must occur if the gears are to properly engage and disengage. Those of skill in the art will recognize that when two gears engage, there are essentially two forces at work. One force, $F_E$, is the force of engagement which tends to keep the gears together, and the other force, $F_S$, is the force of separation which tends to push the gears apart. By orienting the gears so that the moment of $F_E$ is slightly greater than $F_S$, the gears will adequately stay in mesh. Of course, if the moment of $F_E$ is much greater than $F_S$, the gears will lock in mesh, wear more quickly, and may not disengage properly when the motor is stopped. Alternatively, if the moment of $F_S$ is greater than $F_E$, then the gears will be pushed apart or tend to skip, and will not properly engage.

With the above design considerations in mind and using gears having the above-discussed parameters, those of skill will recognize that when the gears are engaged (FIGS. 2B, 4B), the centerlines of the gears define an isosceles triangle. By orienting the gears to define equal angles in this isosceles triangle of around 30°, the correct balance is achieved between the moments of force discussed above.

In the alternative embodiment of FIGS. 2 and 3, the orientation takes a slightly different turn due to the angularity of the yoke relative to the ground. The differential angle defined by lines drawn connecting gear pins 45 and 49 when the yoke is engaged and disengaged is indicated in FIG. 2A by the dashed lines and arrows. It will be appreciated by those skilled in the art, that if this angle is too large, the friction necessary for the yoke to rotate into engagement will necessarily be too large and the assembly will not properly engage. Moreover, if the angle is too small, the chances of an inadvertent engagement are increased such as if the vehicle were to be suddenly pushed in a reverse direction which would cause the yoke to swing about gear pin 45 and into engagement with gear 52 involuntarily driving the vehicle's motor and other gears. Thus with the above considerations in mind, an angle in the range of around 10° to 15° has been found to work suitably well.

Further, in order to facilitate the rotation of the yoke into and out of engagement, the angular orientation of the gears relative to the ground is also important. Preferably the gears in the alternative embodiment should be oriented in the housing so that a line perpendicular to the ground, drawn from the center of output gear 60 is offset around 10 degrees from a line connecting the centers of gear 52 and output gear 60.

Briefly summarizing, a children's riding vehicle having a gear box assembly unit which includes plural driven gears and an output gear non-rotatably connected to an axle shaft connected to the vehicle's wheels has been described. A motor having a pinion is drivingly connected to the plural driven gears and a pivotable yoke provides a mount for at least one of the driven gears. Importantly, when the motor is energized, the yoke automatically pivots to one position for engaging the output gear and driving the vehicle's wheels. When the motor is de-energized, the yoke automatically pivots to another position for disengaging the output gear and allowing the vehicle's wheels to rotate freely without driving or back-driving the motor. In the preferred embodiment, the yoke is suitably counterbalanced about one of the gears such that the friction inherent in the gears and the pins upon which the gears are mounted develops the necessary moment to pivot the gears into engagement and drive the wheels of the vehicle. In alternative embodiments, friction members on the yoke engage the gears to provide the necessary friction to develop the moment necessary for pivoting the gears into engagement to drive the vehicle's wheels.

While preferred and alternative embodiments of the invention have been described, it will be appreciated that variations and modifications thereto are possible without departing from the spirit and scope of the invention. For instance, it is widely known by those of skill in the art that gear parameters such as pressure angle, diametral pitch, and tooth number vary widely. As such, gears having parameters different from those specified above are within the spirit and scope of the invention.

We claim:

1. In a vehicle which includes a driven axle shaft extending transversely of the vehicle having wheels secured thereto and an output gear concentric with the axle shaft non-rotatably connected thereto:

a first gear mounted on the vehicle rotatable about a rotation axis;

an electric motor with an output shaft mounted adjacent the first gear with the output shaft paralleling the rotation axis and having a pinion mounted thereon, with the pinion in driving contact with the first gear;

a second gear in driving contact with the first gear; and a yoke pivotally mounted about the rotation axis of the first gear and providing a mount for the second gear, wherein the yoke pivots to one position wherein the second gear engages the output gear and drives the vehicle's wheels when the motor is energized, and the yoke pivots to another position wherein the second gear disengages the output gear and allows the vehicle's wheels to rotate freely when the motor is de-energized.

2. The vehicle of claim 1 further including a gear housing mounted on the vehicle and at least one driven gear connecting the second gear and the output gear, wherein the housing encloses the first and the second gears, the motor, the at least one driven gear and the yoke and wherein the yoke is pivotally mounted on the housing.

3. The vehicle of claim 2, wherein the housing includes a motor boss joined therein for receiving the motor.

4. The vehicle of claim 2 wherein the yoke includes a friction member integral therewith, wherein the friction member engages at least one of the first or the second gears for developing friction therewith to rotate the yoke into engagement with the output gear when the motor is energized.

5. The vehicle of claim 2, wherein the yoke is counterbalanced about the first gear's rotation axis.

6. In a vehicle which includes a vehicle frame and a driven axle shaft having vehicle wheels secured to the ends thereof, a housing and gear box assembly unit secured to the vehicle's frame and providing a mounting for the axle shaft, the unit comprising:

an output gear concentric with the axle shaft and non-rotatably connected thereto;

a first gear mounted on the housing;

a motor for driving the first gear;

a second gear in driving contact with the first gear;

a yoke providing a mount for the second gear wherein the first gear is rotatable about a rotation axis, and wherein the yoke is pivotable about the rotation axis, the yoke pivoting to one position in which the second gear engages the output gear to drive the vehicle's wheels when the motor is energized, and the yoke pivoting to another position wherein the second gear disengages the output gear when the motor is de-energized;

at least one gear selectively connecting the second gear and the output gear; and a housing enclosing the output gear, first gear, second gear, yoke and the at least one gear.

7. The vehicle of claim 6, wherein the housing includes a motor boss for receiving the motor.

8. The vehicle of claim 7, wherein the yoke includes a fiction member integral therewith for engaging at least one of the first or the second gears to develop friction therebetween to rotate the second gear into engagement with the output gear when the motor is energized.

9. The vehicle of claim 7, wherein the yoke is counterbalanced about the first gear's rotation axis.

10. The vehicle of claim 7, wherein the yoke includes a friction member for engaging at least one of the first or the second gears to develop friction therebetween to rotate the second gear into engagement with the output gear when the motor is energized.

11. In a toy vehicle including a vehicle frame and a driven axle shaft having vehicle wheels secured to the ends thereof:

a first gear having a concentric pinion mounted on the frame for rotation about a first rotation axis;

an electric motor with an output shaft mounted on the frame with the output shaft paralleling the first rotation axis and having a pinion mounted thereon in driving contact with the first gear;

a second gear having a concentric pinion mounted on the yoke for rotation about a second rotation axis, wherein the second gear is in driving contact with the concentric pinion gear on the first gear;

a third gear having a concentric pinion mounted on the frame for rotation about a third rotation axis wherein the third gear is in selective driving contact with the concentric pinion on the second gear;

an output gear concentric with the axle shaft and non-rotatably connected thereto, the output gear in driving contact with the concentric pinion on the third gear; and a yoke, mounted on the frame and pivotable about the first rotation axis and providing a mount for the second gear, wherein the yoke automatically pivots to one position wherein the second gear engages the output gear when the motor is energized and the yoke automatically pivots to another position wherein the second gear disengages the output gear when the motor is de-energized.

12. The vehicle of claim 11, wherein the yoke includes a friction member joined thereon engaging the second gear for developing friction therebetween to rotate the yoke into engagement with the output gear when the motor is energized.

13. The vehicle of claim 11, wherein the yoke is generally counterbalanced about the first gear's rotation axis.

14. The vehicle of claim 12, wherein the friction member is in contact with the concentric pinion gear on the second gear.

15. The vehicle of claim 11, further comprising a housing mounted on the frame and receiving the axle shaft, enclosing the first, second, third, and output gears, the motor, and the yoke.

16. The vehicle of claim 15, wherein the housing further includes a motor boss for receiving the motor.

* * * * *